(12) United States Patent
Inoue et al.

(10) Patent No.: US 11,757,114 B2
(45) Date of Patent: Sep. 12, 2023

(54) FUEL CELL SYSTEM AND METHOD OF CONTROLLING THE SYSTEM

(71) Applicant: HONDA MOTOR CO., LTD., Tokyo (JP)

(72) Inventors: Kazuhide Inoue, Wako (JP); Takuto Nakagawa, Wako (JP); Manabu Iwaida, Wako (JP); Kiyohide Hibino, Wako (JP); Atsushi Kamachi, Wako (JP); Akane Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/681,803

(22) Filed: Feb. 27, 2022

(65) Prior Publication Data
US 2022/0302476 A1    Sep. 22, 2022

(30) Foreign Application Priority Data

Mar. 17, 2021  (JP) ................................. 2021-043630

(51) Int. Cl.
*H01M 8/0444* (2016.01)
*H01M 8/04082* (2016.01)
(Continued)

(52) U.S. Cl.
CPC ..... *H01M 8/0447* (2013.01); *H01M 8/04201* (2013.01); *H01M 8/04805* (2013.01); *H01M 8/0441* (2013.01); *H01M 8/04156* (2013.01); *H01M 8/04179* (2013.01); *H01M 8/04231* (2013.01); *H01M 8/04388* (2013.01); *H01M 8/04395* (2013.01); *H01M 8/04447* (2013.01); *H01M 8/04455* (2013.01); *H01M 8/04761* (2013.01)

(58) Field of Classification Search
CPC .......... H01M 8/0447; H01M 8/04201; H01M 8/04805; H01M 8/04089; H01M 8/04104; H01M 8/04082; H01M 8/04097; H01M 8/04141; H01M 8/04156; H01M 8/04164; H01M 8/04179; H01M 8/04231; H01M 8/04358; H01M 8/04395; H01M 8/04402; H01M 8/0441; H01M 8/04455; H01M 8/04462; H01M 8/04514; H01M 8/04723; H01M 8/04753; H01M 8/04761; H01M 8/04798; H01M 8/04843
See application file for complete search history.

(56) References Cited

U.S. PATENT DOCUMENTS

2008/0261089 A1*  10/2008  Nonobe ............ H01M 8/04805
                                              429/411
2019/0198897 A1    6/2019  Okamura et al.

FOREIGN PATENT DOCUMENTS

JP    2007080723     *  3/2007
JP    2019-114351 A     7/2019

* cited by examiner

*Primary Examiner* — Matthew W Van Oudenaren
(74) *Attorney, Agent, or Firm* — Carrier, Shende & Associates P.C.; Fulchand P. Shende; Joseph P. Carrier (57) ABSTRACT

A control unit estimates a discharged fuel gas amount, i.e., an amount of fuel gas discharged from the outlet of a cathode flow field, of a fuel exhaust gas introduced from a communication flow path to the inlet of the cathode flow field and then flowing through a cathode. The control unit calculates an oxygen-containing gas amount necessary for dilution at the time of discharge into the atmosphere, from the estimated discharged fuel gas amount, and sets a discharge amount of the air pump, based on the calculated oxygen-containing gas amount.

4 Claims, 5 Drawing Sheets

(51) Int. Cl.
*H01M 8/04791* (2016.01)
*H01M 8/04223* (2016.01)
*H01M 8/0438* (2016.01)
*H01M 8/04119* (2016.01)
*H01M 8/04746* (2016.01)

FIG. 5

FUEL CELL SYSTEM AND METHOD OF CONTROLLING THE SYSTEM

CROSS-REFERENCE TO RELATED APPLICATIONS

This application is based upon and claims the benefit of priority from Japanese Patent Application No. 2021-043630 filed on Mar. 17, 2021, the contents of which are incorporated herein by reference.

BACKGROUND OF THE INVENTION

Field of the Invention

The present invention relates to a fuel cell system including a fuel cell that generates power by using an oxygen-containing gas supplied to a cathode and a fuel gas supplied to an anode, and also relates to a method of controlling the system.

Description of the Related Art

For example, a solid polymer electrolyte fuel cell includes a membrane electrode assembly (MEA) in which an anode is provided on one surface of an electrolyte membrane and a cathode is provided on the other surface thereof, which is a polymer ion exchange membrane. The membrane electrode assembly is sandwiched between separators to form a power generation cell (unit cell). Usually, a predetermined number of power generation cells are stacked to be incorporated into, for example, a fuel cell vehicle (fuel cell electric vehicle) or the like as a fuel cell stack.

In a fuel cell vehicle of this type, when fuel exhaust gas is discharged into the atmosphere, in order to discharge the fuel exhaust gas with a hydrogen concentration lower than a predetermined concentration, an oxygen-containing gas for dilution is taken in from an air pump, and the fuel exhaust gas is diluted with the oxygen-containing gas for dilution to thereby reduce the hydrogen concentration.

For example, JP 2019-114351 A discloses a fuel cell system in which a discharged fluid containing fuel exhaust gas (unconsumed fuel gas) and liquid water discharged through a drain valve of a gas-liquid separator provided on the outlet side of an anode flow field of a fuel cell stack is introduced into a cathode from the inlet of a cathode flow field through a connecting pipe. In this fuel cell system, the fuel gas in the fuel exhaust gas contained in the discharged fluid is subjected to a catalytic reaction at the cathode ([0049] of JP 2019-114351 A).

SUMMARY OF THE INVENTION

In the fuel cell system disclosed in JP 2019-114351 A, the fuel exhaust gas with the fuel gas having been decreased due to the catalytic reaction is discharged from the outlet of the cathode flow field, so that the fuel gas requiring dilution can be reduced.

When the fuel gas to be diluted is diluted, air to be taken in from the air pump is increased by an amount corresponding to the amount of the oxygen-containing gas for dilution.

However, if the oxygen-containing gas for dilution is taken in more than necessary, the power consumption of the air pump becomes excessive and the power efficiency of the fuel cell system deteriorates.

The present invention has been made taking the above problem into account, and an object of the present invention is to provide a fuel cell system and a method of controlling the fuel cell system which are capable of optimizing an amount of oxygen-containing gas to be used to dilute the fuel exhaust gas discharged from the outlet of the cathode flow field.

According to an aspect of the present invention, there is provided a fuel cell system including a fuel cell configured to generate power by using an oxygen-containing gas discharged from an air pump and supplied to a cathode through an inlet of a cathode flow field and a fuel gas supplied to an anode through an inlet of an anode flow field, the fuel cell system further including: a communication flow path configured to introduce a fuel exhaust gas discharged from an outlet of the anode flow field of the fuel cell into the inlet of the cathode flow field; and a control unit configured to control the fuel cell system, wherein the control unit: estimates an amount of fuel gas discharged from an outlet of the cathode flow field, of the fuel exhaust gas that is introduced from the communication flow path into the inlet of the cathode flow field and then flows through the cathode; calculates an amount of oxygen-containing gas necessary for dilution at a time of discharge into atmosphere, from the estimated amount of fuel gas; and sets a discharge amount of the air pump, based on the calculated amount of oxygen-containing gas.

According to another aspect of the present invention, there is provided a method of controlling a fuel cell system including a fuel cell configured to generate power by using an oxygen-containing gas discharged from an air pump and supplied to a cathode through an inlet of a cathode flow field and a fuel gas supplied to an anode through an inlet of an anode flow field, the method including: introducing a fuel exhaust gas discharged from an outlet of the anode flow field of the fuel cell into the inlet of the cathode flow field through a communication flow path; estimating an amount of fuel gas discharged from an outlet of the cathode flow field, of the fuel exhaust gas that is introduced from the communication flow path to the inlet of the cathode flow field and then flows through the cathode; calculating an amount of oxygen-containing gas necessary for dilution at a time of discharge into atmosphere, from the estimated amount of fuel gas; and setting a discharge amount of the air pump, based on the calculated amount of oxygen-containing gas.

According to the present invention, an amount of fuel gas discharged from an outlet of the cathode flow field, of the fuel exhaust gas flowing from the inlet of the cathode flow field to the cathode is estimated, an amount of oxygen-containing gas necessary for dilution is calculated from the estimated amount of fuel gas, and a discharge amount of the air pump is set, based on the calculated amount of oxygen-containing gas. Therefore, the amount of the oxygen-containing gas required for dilution can be accurately grasped, and the amount can be optimized (minimized). As a result, it is possible to minimize an increase in the electric power consumed by the air pump and suppress a decrease in the electric power efficiency of the fuel cell system.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Embodiments of a fuel cell system and a method of controlling the system according to the present invention will be described below in detail with reference to the accompanying drawings.

[Configuration]

Figure 1:
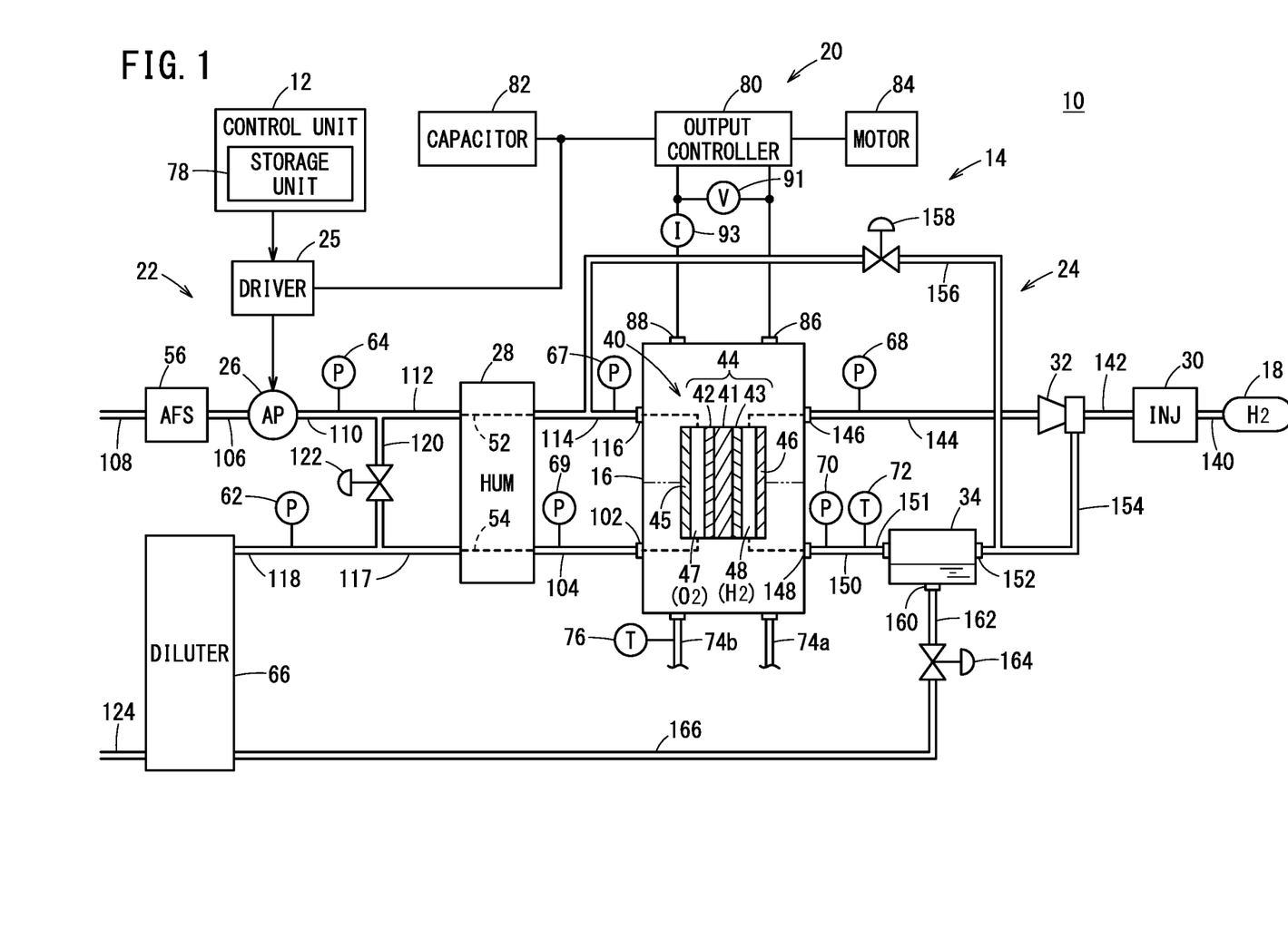
FIG. 1 is a schematic block diagram showing a configuration of a fuel cell vehicle incorporating a fuel cell system according to an embodiment of the present invention.

FIG. 1 is a schematic block diagram showing a configuration of a fuel cell vehicle 10 incorporating the fuel cell system 14 according to an embodiment.

The fuel cell vehicle 10 includes a control unit 12 for controlling the entire fuel cell vehicle 10, the fuel cell system 14, and an output unit 20 electrically connected to the fuel cell system 14.

The fuel cell system 14 is basically made up of a fuel cell stack (also referred to simply as a fuel cell) 16, a hydrogen tank 18, an oxygen-containing gas system device 22, and a fuel gas system device 24.

The oxygen-containing gas system device 22 includes an air pump 26 and a humidifier (HUM) 28.

The fuel gas system device 24 includes an injector (INJ) 30, an ejector (EJT) 32, and a gas-liquid separator 34.

In the fuel cell stack 16, a plurality of power generation cells 40 are stacked. Each power generation cell 40 includes a membrane electrode assembly 44 and separators 45, 46 for sandwiching and holding the membrane electrode assembly 44.

The membrane electrode assembly 44 includes, for example, a solid polymer electrolyte membrane 41 which is a thin film of perfluorosulfonic acid containing water, and a cathode 42 and an anode 43 which sandwich the solid polymer electrolyte membrane 41.

The cathode 42 and the anode 43 each have a gas diffusion layer (not shown) made of carbon paper or the like. Porous carbon particles with platinum alloy being supported on surfaces of the carbon particles are uniformly deposited on the surface of the gas diffusion layer to thereby form an electrode catalyst layer (not shown). The electrode catalyst layer is formed on each of both surfaces of the solid polymer electrolyte membrane 41.

A cathode flow field (oxygen-containing gas flow field) 47 for establishing communication between an oxygen-containing gas inlet passage 116 and an oxygen-containing gas outlet passage 102 is formed on a surface of one separator 45 facing the membrane electrode assembly 44.

An anode flow field (fuel gas flow field) 48 for establishing communication between a fuel gas inlet passage 146 and a fuel gas outlet passage 148 is formed on a surface of the other separator 46 facing the membrane electrode assembly 44.

In the anode 43, when fuel gas is supplied, hydrogen ions are generated from hydrogen molecules by an electrode reaction by a catalyst, and the hydrogen ions are transmitted through the solid polymer electrolyte membrane 41 to move to the cathode 42, while electrons are released from the hydrogen molecules.

Electrons released from the hydrogen molecules move from a negative terminal 86 through an output controller 80 and an external load to the cathode 42 through a positive terminal 88.

In the cathode 42, hydrogen ions and electrons react with oxygen contained in the supplied oxygen-containing gas by the action of the catalyst, to thereby generate water.

A voltage sensor 91 for detecting a power generation voltage is provided between the positive terminal 88 and the negative terminal 86. Further, a current sensor 93 for detecting a power generation current is provided in a wire between the positive terminal 88 and the output controller 80.

The air pump 26 comprises a mechanical supercharger or the like driven by a driver 25 including an inverter and a motor, and has a function of taking in atmospheric air (air), pressurizing it, and supplying it to the humidifier 28.

The humidifier 28 has a flow path 52 through which an oxygen-containing gas (dried air) flows, and a flow path 54 through which a discharged gas (wet oxygen-containing exhaust gas and fuel exhaust gas described later) discharged from the cathode flow field 47 of the fuel cell stack 16 flows. The discharged gas discharged from the cathode flow field 47 of the fuel cell stack 16 is supplied to the flow path 54 through the oxygen-containing gas outlet passage 102 and a conduit 104 of the fuel cell stack 16.

The conduit 104 is provided with a cathode outlet pressure sensor 69 for detecting the pressure of the oxygen-containing gas flowing through the conduit 104 as a cathode outlet pressure Pco [kPa].

The humidifier 28 has a function of humidifying the oxygen-containing gas supplied from the air pump 26. That is, the humidifier 28 transfers water (moisture) contained in the discharged gas to the supply gas (oxygen-containing gas) through a porous membrane.

The inlet side of the air pump 26 communicates with the atmosphere through a conduit 106, an air flow sensor (AFS) (flow rate sensor) 56, and a conduit 108.

The air flow sensor 56 measures a mass flow rate M [g/min] of the oxygen-containing gas supplied from the air pump 26 to the cathode flow field 47 of the fuel cell stack 16 and outputs the measurement result to the control unit 12.

The discharge side of the air pump 26 communicates with one end side of the flow path 52 of the humidifier 28 through conduits 110 and 112. The other end side of the flow path 52 of the humidifier 28 communicates with one end side of a conduit 114, and the other end side of the conduit 114 communicates with the cathode flow field 47 in the fuel cell stack 16 through the oxygen-containing gas inlet passage 116.

The conduit 110 is provided with a discharge pressure sensor 64 for detecting the pressure of the oxygen-containing gas discharged from the air pump 26 as an oxygen-containing gas discharge pressure Po [kPa].

The conduit 114 is provided with a cathode inlet pressure sensor 67 for detecting the pressure of the oxygen-containing gas flowing through the conduit 114 as a cathode inlet pressure Pci [kPa].

The discharge side of the flow path 54 of the humidifier 28 communicates with one inlet side of a diluter 66 through conduits 117 and 118.

The conduit 110 at the discharge side of the air pump 26 bifurcates, one of which communicates with the conduit 112, and the other of which communicates with the conduit 118 via a bypass conduit 120 and a bypass valve 122.

The conduit 118 is provided with a diluter inlet pressure sensor 62 for detecting the pressure of the gas flowing through the conduit 118 as a dilution inlet pressure Pd [kPa].

The hydrogen tank 18 is a container including a solenoid shutoff valve, and compresses highly pure hydrogen under high pressure, and stores the compressed hydrogen.

The fuel gas discharged from the hydrogen tank 18 is supplied through a conduit 140, the injector 30, a conduit 142, the ejector 32, and a conduit 144 to the inlet of the anode flow field 48 of the fuel cell stack 16 through the fuel gas inlet passage 146.

The conduit 144 is provided with an anode inlet pressure sensor 68 for detecting the pressure of the fuel gas flowing through the conduit 144 as an anode inlet pressure Pai [kPa].

The outlet of the anode flow field 48 communicates with the inlet 151 of the gas-liquid separator 34 through the fuel gas outlet passage 148 and a conduit 150, and fuel exhaust gas (anode off-gas) which is a hydrogen-containing gas is supplied from the anode flow field 48 to the gas-liquid separator 34.

The conduit 150 is provided with an anode outlet pressure sensor 70 and an anode outlet temperature sensor 72.

The anode outlet pressure sensor 70 detects the pressure of the fuel exhaust gas flowing through the conduit 150 as an anode outlet pressure Poa [kPa]. The anode outlet temperature sensor 72 detects the temperature of the fuel exhaust gas flowing through the conduit 150 as an anode outlet temperature To [° C.].

The gas-liquid separator 34 separates the fuel exhaust gas into a gas component and a liquid component (liquid water). The gas component (fuel exhaust gas) of the fuel exhaust gas is discharged from the gas discharge port 152 of the gas-liquid separator 34 and supplied to the ejector 32 through a conduit 154. On the other hand, when a bleed valve 158 is opened when necessary, the fuel exhaust gas is also supplied to the conduit 114 for oxygen-containing gas, through a communication conduit 156 (communication flow path) and the bleed valve 158.

The bleed valve 158 is opened in order to prevent the deterioration of the anode 43 caused by a lowered hydrogen concentration in the anode flow field 48 due to nitrogen gas in the cathode flow field 47 passing through the membrane electrode assembly 44. That is, the bleed valve 158 is opened when it is determined that the hydrogen concentration in the anode flow field 48 has decreased during normal power generation such as during traveling.

The fuel exhaust gas supplied to the conduit 114 for oxygen-containing gas is mixed, in the conduit 114, with the oxygen-containing gas supplied from the air pump 26 and is supplied to the cathode flow field 47 of the fuel cell stack 16 through the oxygen-containing gas inlet passage 116.

Part of the fuel exhaust gas supplied to the cathode flow field 47 is hydrogen-ionized by the catalytic reaction of the cathode 42, and the hydrogen ions react with the oxygen-containing gas to generate water. The remaining part, i.e., the unreacted fuel exhaust gas, is discharged from the oxygen-containing gas outlet passage 102 and supplied to the diluter 66 through the conduit 104, the flow path 54, the conduit 117, and the conduit 118. When the unreacted fuel exhaust gas is discharged from the diluter 66, the unreacted fuel exhaust gas is diluted by the oxygen-containing gas supplied from the bypass conduit 120 and discharged to the outside (atmosphere) of the fuel cell vehicle 10 through the conduit 118, the diluter 66, and a conduit 124.

Fuel gas is supplied to the ejector 32 from the injector 30 provided on the upstream side of the ejector 32 via the conduit 142. Therefore, the fuel exhaust gas (gas component) supplied through the gas-liquid separator 34 is suctioned by the ejector 32 and mixed with the fuel gas. The gas component in the mixed state flows through the conduit 144 of the fuel cell stack 16, and is supplied to the anode flow field 48 of the fuel cell stack 16 through the fuel gas inlet passage 146.

The liquid component of the fuel exhaust gas flows from the liquid discharge port 160 of the gas-liquid separator 34 through a conduit 162, a drain valve 164, a conduit 166, and the diluter 66, and is then discharged through the conduit 124 to the outside of the fuel cell vehicle 10.

In practice, part of the fuel exhaust gas is also discharged through the drain valve 164 into the conduit 166, together with the liquid component. In order to dilute the hydrogen gas contained in the fuel exhaust gas and discharge it to the outside, part of the oxygen-containing gas discharged from the air pump 26 is supplied to the diluter 66 through the bypass conduit 120 and the conduit 118.

Therefore, the hydrogen gas contained in the fuel exhaust gas is diluted in the diluter 66 and discharged to the outside.

The fuel cell stack 16 further includes a coolant supply passage 74a and a coolant discharge passage 74b for supplying and discharging the coolant to and from a coolant flow field (not shown) provided in the fuel cell stack 16. A temperature sensor 76 is provided in the coolant discharge passage 74b. The temperature sensor 76 measures the temperature Ts [° C.] of the coolant flowing through the coolant discharge passage 74b as the temperature of the fuel cell stack 16.

The control unit 12 includes a microcomputer including a CPU (not shown), a storage unit (ROM and RAM) 78, and the like.

In addition to the control programs for the fuel cell vehicle 10 and the fuel cell system 14, characteristics 201 and 202 (FIGS. 4A and 4B) to be described later are stored in the storage unit 78.

The CPU of the control unit 12 carries out operation control of the fuel cell vehicle 10 and the fuel cell system 14 by executing computing according to the control programs. Further, the control unit 12 outputs control signals such as a valve opening instruction and a valve closing instruction to each component such as the bypass valve 122, based on detection signals received from various sensors such as the discharge pressure sensor 64, the temperature sensor 76, and an accelerator opening degree sensor (not shown).

[Operation]

Next, the operation of the fuel cell system 14 basically constructed as described above will be described in the following order: [1] the operation during normal power generation when the fuel cell vehicle 10 is traveling or the like; and [2] the operation for calculating the amount of oxygen-containing gas for dilution (dilution oxygen-containing gas amount) when the hydrogen concentration lowers in the anode flow field 48.

Figure 2:
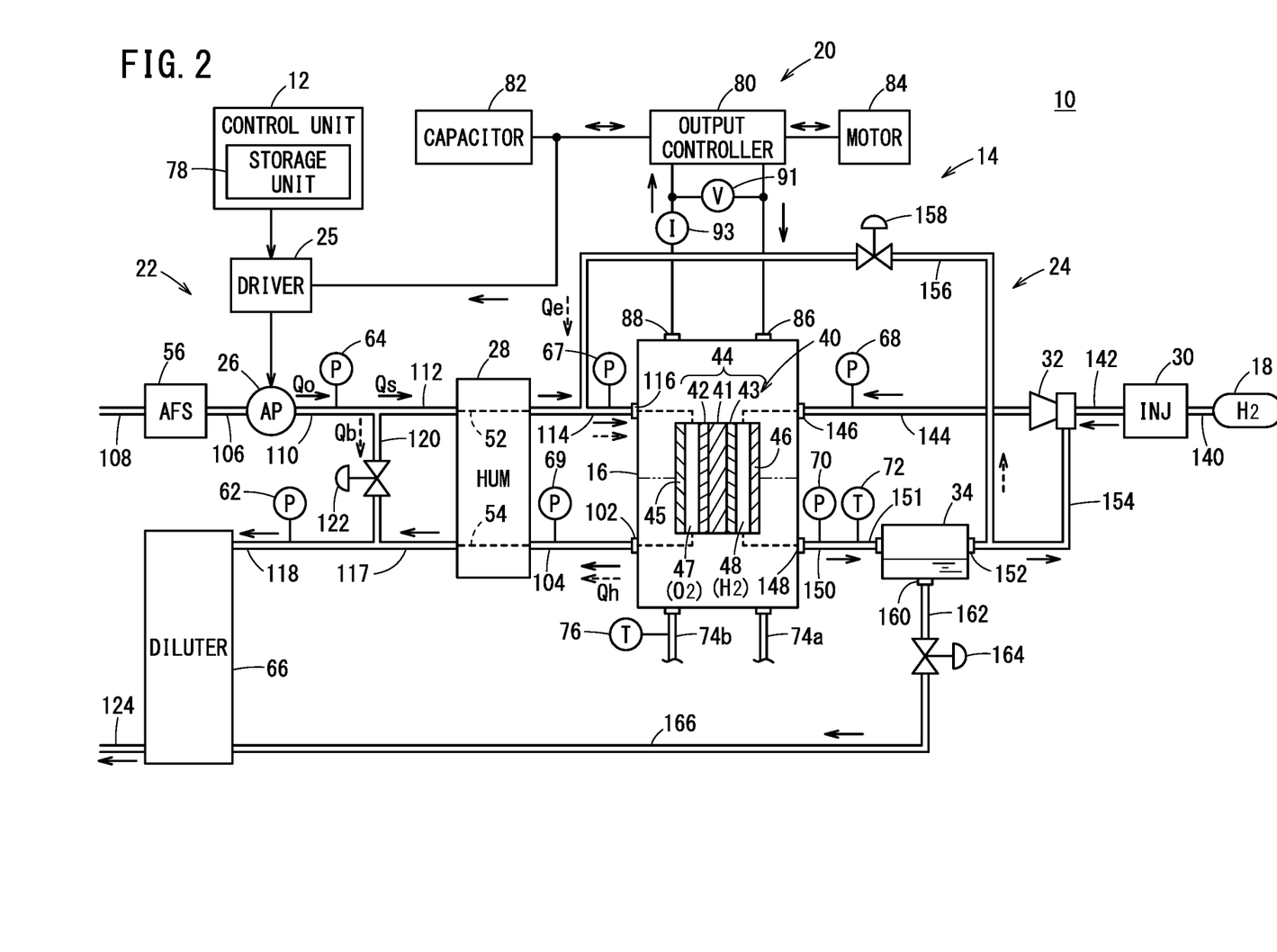
FIG. 2 is a block diagram showing an electric current flow and a gas flow in the fuel cell system shown in FIG. 1 by arrows.

[1] Description of Operation During Normal Power Generation when Fuel Cell Vehicle 10 is Traveling or the Like An operation during normal power generation (such as during traveling when the hydrogen concentration on the anode 43 side is equal to or higher than a threshold value at which the bleed valve 158 does not need to be opened) will be described below with reference to FIG. 2. In FIG. 2, solid line arrows indicate flows of fuel gas, oxygen-containing gas, and electric power, and broken line arrows indicate flows of gas for explanation of the calculation operation of a dilution oxygen-containing gas amount, which will be described later.

During normal power generation, the bleed valve 158 is closed, and the bypass valve 122 is opened for dilution primarily when the drain valve 164 is opened.

On the side of the oxygen-containing gas system device 22, the air pump 26 is driven under the control of the control unit 12 through the driver 25 that operates by using high voltage power of a capacitor 82 as a power source. The oxygen-containing gas discharged from the driven air pump 26 is humidified through the conduits 110, 112 and the humidifier 28, and then supplied through the conduit 114 to the oxygen-containing gas inlet passage 116 of the fuel cell stack 16.

Wet gas is discharged from the oxygen-containing gas outlet passage 102 of the fuel cell stack 16 to the conduit 104, and flows through the flow path 54. The humidifier 28 transfers water contained in the discharged wet gas flowing through the flow path 54 to the supply gas (oxygen-containing gas) flowing through the flow path 52, through the porous membrane.

On the other hand, in the fuel gas system device 24 side, fuel gas (hydrogen gas) is supplied from the high-pressure hydrogen tank 18 to the conduit 142 under the valve opening action of the injector 30. The fuel gas is mixed with the fuel exhaust gas suctioned into the ejector 32 through the conduit (circulation path) 154, passes through the ejector 32, and is then supplied to the fuel gas inlet passage 146 of the fuel cell stack 16.

In the fuel cell stack 16, the oxygen-containing gas is supplied from the oxygen-containing gas inlet passage 116 to the cathode 42 through the cathode flow field 47 of each power generation cell 40. On the other hand, hydrogen gas is supplied from the fuel gas inlet passage 146 to the anode 43 through the anode flow field 48 of each power generation cell 40. Therefore, in each power generation cell 40, the oxygen gas contained in the air supplied to the cathode 42 and the hydrogen gas supplied to the anode 43 are consumed by an electrochemical reaction (fuel cell reaction) in the electrode catalyst layer to generate power.

Then, the reaction product water and the cathode exhaust gas made of the air supplied to and consumed at the cathode 42 are discharged to the oxygen-containing gas outlet passage 102. They flow through the conduit 104, the flow path 54, and the conduit 117 to join the oxygen-containing gas supplied from the bypass conduit 120, and is then supplied to the diluter 66 through the conduit 118. They are discharged from the diluter 66 to the outside of the fuel cell vehicle 10 through the conduit 124.

The hydrogen gas supplied to and consumed by the anode 43 is discharged to the fuel gas outlet passage 148 as fuel exhaust gas (partially-consumed fuel gas).

The fuel exhaust gas is introduced into the gas-liquid separator 34 through the conduit 150 to remove liquid components (liquid water), and then drawn by the ejector 32 through the conduit 154 to be used for power generation reaction in the fuel cell stack 16.

A high-voltage power generated by the fuel cell stack 16 in which a plurality of power generation cells 40 are electrically connected in series is stored in the capacitor 82 through the output controller 80.

The fuel cell vehicle 10 travels by the motor 84 being driven by the electric power of the capacitor 82 and/or the fuel cell stack 16 under the control of the output controller 80 in accordance with a load state such as an accelerator opening degree, a setting temperature of an air conditioner (not shown), and the like.

[2] Description of Calculation Operation of Dilution Oxygen-Containing Gas Amount Next, with reference to the flow chart shown in FIG. 3, the process for calculating the dilution oxygen-containing gas amount Qb that needs to be supplied from the bypass valve 122 to the diluter 66 side when the hydrogen concentration on the anode 43 (anode flow field 48) side decreases will be described.

Figure 3:
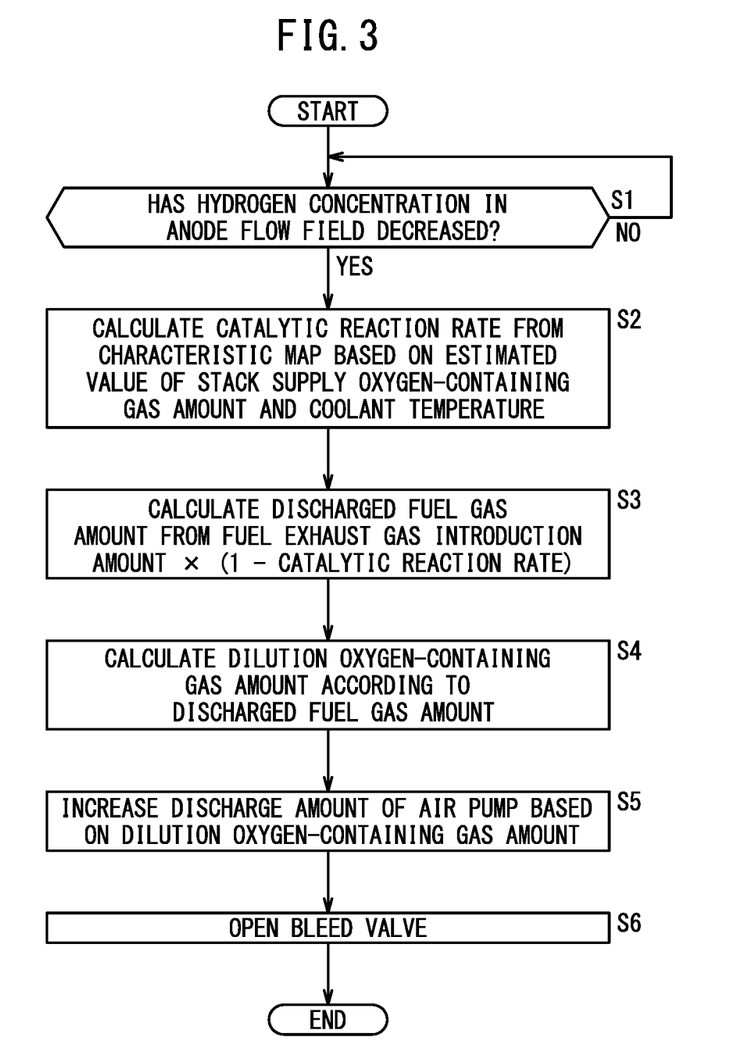
FIG. 3 is a flowchart for explaining the operation of the fuel cell system shown in FIG. 1.

The processing (control program) according to the flowchart of FIG. 3 is executed by (the CPU of) the control unit 12. However, reference to the above each time becomes complicated, and therefore such reference is made as necessary.

First, before the detailed processing according to the flowchart of FIG. 3 is described, the background of the calculation processing of the dilution oxygen-containing gas amount Qb and the outline of the processing will be described.

<Background of Calculation Processing of Dilution Oxygen-Containing Gas Amount and Outline of Processing>

During the normal power generation described above, when nitrogen existing in the cathode flow field 47 passes through the membrane electrode assembly 44 and enters the anode flow field 48, the hydrogen concentration in the anode flow field 48 decreases. There is a concern that the anode 43 deteriorates due to a decrease in hydrogen concentration.

In order to prevent or suppress this deterioration, the control unit 12 opens the bleed valve 158 when it detects a sign that the hydrogen concentration decreases to a predetermined threshold value or less. As a result, fuel exhaust gas containing nitrogen gas that has permeated the membrane from the cathode flow field 47 side to the anode flow field 48 in the fuel cell stack 16, flows from the fuel gas outlet passage 148 through the gas-liquid separator 34, the communication conduit 156, the conduit 114, and the oxygen-containing gas inlet passage 116 to the cathode 42 of the cathode flow field 47.

In this case, hydrogen gas in the fuel exhaust gas flowing through the cathode 42 is hydrogen-ionized in the cathode electrode catalyst layer, and is consumed by a catalytic reaction (cathode catalyst humidifying reaction) in which the hydrogen ions react with oxygen gas to generate water.

That is, the hydrogen gas flowing through the cathode 42 is consumed by the cathode 42 in accordance with the catalytic reaction rate Rc of the cathode 42.

Then, a predetermined amount of hydrogen gas in the fuel exhaust gas is consumed, and the fuel exhaust gas composed of the hydrogen gas and nitrogen that remain after the consumption is introduced from the cathode flow field 47 into the conduit 118 through the oxygen-containing gas outlet passage 102, the conduit 104, the flow path 54 and the conduit 117.

An oxygen-containing gas can join fluid in the conduit 118 through the bypass conduit 120.

In order to dilute the hydrogen gas in the fuel exhaust gas introduced into the conduit 118 from the conduit 117 to a specified concentration or less and discharge it to the outside, it is necessary to increase the discharge oxygen-containing gas amount Qo to be discharged from the air pump 26.

In order to increase the discharge oxygen-containing gas amount Qo, it is necessary to increase the power consumption of the driver 25 and the air pump 26. In order to limit the increase in the power consumption of the driver 25 and the air pump 26 to the minimum necessary, it is necessary to minimize the increase in the discharge oxygen-containing gas amount Qo.

Therefore, it is necessary to accurately calculate the minimum necessary amount of oxygen-containing gas for dilution (dilution oxygen-containing gas amount) (bypass oxygen-containing gas amount) Qb. The background and the outline of the processing are described as above.

<Calculation Process of Dilution Oxygen-Containing Gas Amount>

During power generation of the fuel cell stack 16, when the bleed valve 158 and the bypass valve 122 are closed, the processing according to the flowchart of FIG. 3 is started.

In step S1, it is determined whether or not the hydrogen concentration in the anode flow field 48 has decreased.

The hydrogen concentration in the anode flow field 48 can be estimated by estimating the amount of nitrogen permeating the membrane electrode assembly 44 from the cathode 42 side to the anode 43 side, on the basis of the temperature of the anode 43 (for which the temperature Ts of the coolant is substituted), the anode inlet pressure Pai, and the cathode inlet pressure Pci.

When it is determined that the hydrogen concentration has decreased to a predetermined threshold value or less (step S1: YES), the control proceeds to step S2 in which the catalytic reaction rate Rc is calculated by referring to the characteristic 201 shown in FIG. 4A and/or the characteristic 202 shown in FIG. 4B based on a stack supply oxygen-containing gas amount (i.e., an amount of oxygen-containing gas to be supplied to the fuel cell stack) Qs and the coolant temperature Ts.

Figure 4A:
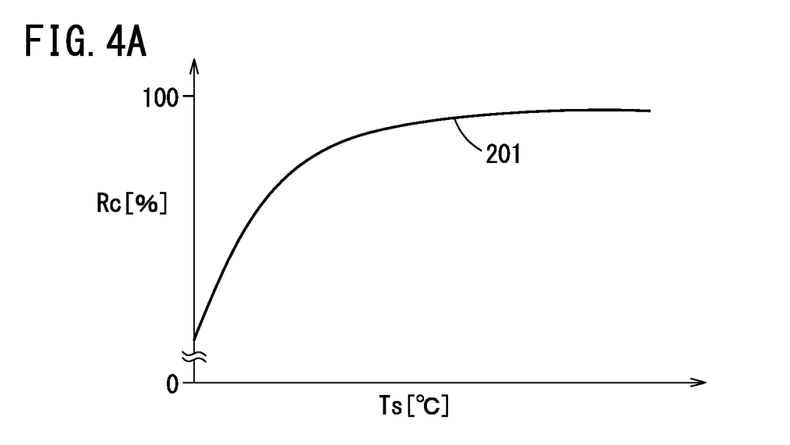
FIG. 4A is a characteristic diagram showing the relationship between a coolant outlet temperature and a catalytic reaction rate.

As shown in the characteristic 201 of FIG. 4A, the catalytic reaction rate Rc increases with increase in the coolant temperature Ts measured by the temperature sensor 76. Further, as shown in the characteristic 202 of FIG. 4B, the catalytic reaction rate Rc decreases with increase in the stack supply oxygen-containing gas amount Qs.

Figure 4B:
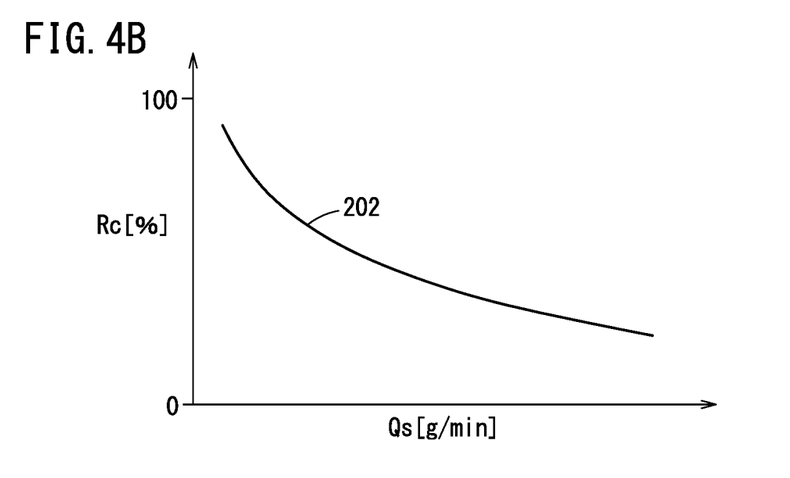
FIG. 4B is a characteristic diagram showing the relationship between an amount of oxygen-containing gas supplied to a stack and the catalytic reaction rate.
Figure 4C:
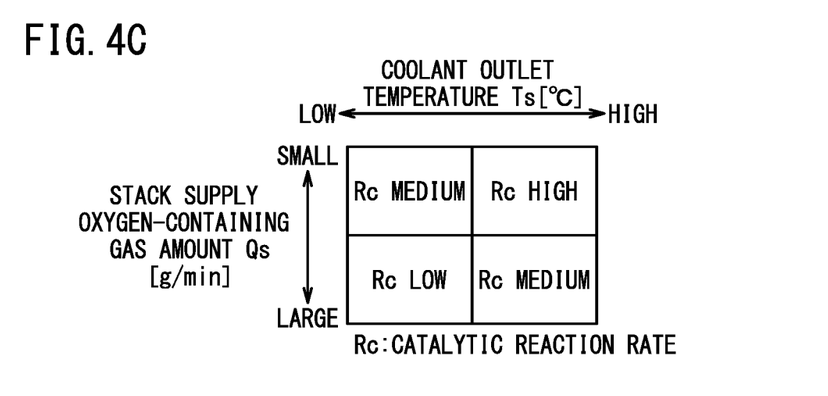
FIG. 4C is an explanatory diagram of the catalytic reaction rate with the amount of oxygen-containing gas supplied to the stack and a coolant outlet temperature as parameters.

When the characteristics 201 of FIG. 4A and the characteristics 202 of FIG. 4B are combined, the relationship shown in FIG. 4C is obtained. That is, the higher the coolant outlet temperature Ts is and the smaller the stack supply oxygen-containing gas amount Qs is (the smaller the value is), the higher the catalytic reaction rate Rc is.

The characteristics 201 and 202 are measured in advance corresponding to the model of the fuel cell stack 16 and stored in the storage unit 78.

When the bypass valve 122 and the bleed valve 158 are closed (Qb=0, Qe=0), the stack supply oxygen-containing gas amount Qs is equal to the discharge oxygen-containing gas amount Qo of the air pump 26, which is acquired as a measurement value of the air flow sensor 56.

When the drain valve 164 is open to discharge the liquid water and the bypass valve 122 is open for dilution of hydrogen contained in the fuel exhaust gas in the liquid water, the stack supply oxygen-containing gas amount Qs is estimated as shown in the following equation (1) (see FIG. 2).

$$Qs = Qo - Qb \quad (1)$$

Here, Qo is the discharge oxygen-containing gas amount of the air pump 26, and Qb is the amount of oxygen-containing gas flowing through the bypass conduit 120.

The oxygen-containing gas amount Qb flowing through the bypass conduit 120 may be detected by a gas flow sensor being inserted into the bypass conduit 120, or may be estimated from the differential pressure between the pressure value measured by the discharge pressure sensor 64 and the pressure value measured by the diluter inlet pressure sensor 62.

Next, in step S3, a discharged fuel gas amount Qh, i.e., an amount of the unreacted fuel gas discharged from the cathode flow field 47 of the fuel cell stack 16, in which the catalytic reaction did not occur, is calculated by the following equation (2), where a fuel exhaust gas introduction amount Qe, i.e., an amount of the fuel exhaust gas introduced into the cathode flow field 47 when the bleed valve 158 is opened, is multiplied by the unreacted ratio. The value of the catalytic reaction rate Rc in the equation (2) is obtained by converting a percentage [%] to a decimal.

$$Qh = Qe \times (1 - Rc) \quad (2)$$

In the equation (2), the fuel exhaust gas introduction amount Qe flowing through the bleed valve 158 may be detected by a gas flow sensor being inserted into the communication conduit 156, or may be estimated from the differential pressure between the pressure value measured by the anode outlet pressure sensor 70 and the pressure value measured by the cathode inlet pressure sensor 67.

Then, in step S4, the dilution oxygen-containing gas amount Qb (increase amount) necessary to keep the hydrogen concentration below the target exhaust concentration Dtar is calculated according to the discharged fuel gas amount Qh by the following equation (3):

$$Qb = \{(100[\%] - D\text{tar}\,[\%]) \times Qh\} / D\text{tar}\,[\%] \quad (3)$$

Next, in step S5, the air pump 26 is driven through the driver 25 so that the necessary dilution oxygen-containing gas amount Qb calculated according to the equation (3) flows through the bypass conduit 120. As a result, the dilution oxygen-containing gas amount Qb (increase amount) is supplied to the bypass conduit 120. When the bypass valve 122 is opened, the pump discharge amount increases by the dilution oxygen-containing gas amount Qb, and the increase amount of the oxygen-containing gas is supplied to the bypass conduit 120.

Next, in step S6, the bleed valve 158 is opened to introduce the fuel exhaust gas containing nitrogen from the anode 43 side into the cathode 42 side of the fuel cell stack 16.

In this case, part of the fuel gas is consumed in the fuel cell stack 16 by the catalytic reaction of the cathode 42, and the discharged fuel gas amount Qh discharged from the oxygen-containing gas outlet passage 102 is mixed with the dilution oxygen-containing gas amount Qb (increase amount). Thus, the exhaust fuel gas is diluted through the diluter 66 so as to keep the hydrogen concentration below the target exhaust concentration Dtar, and discharged into the atmosphere.

Figure 5:
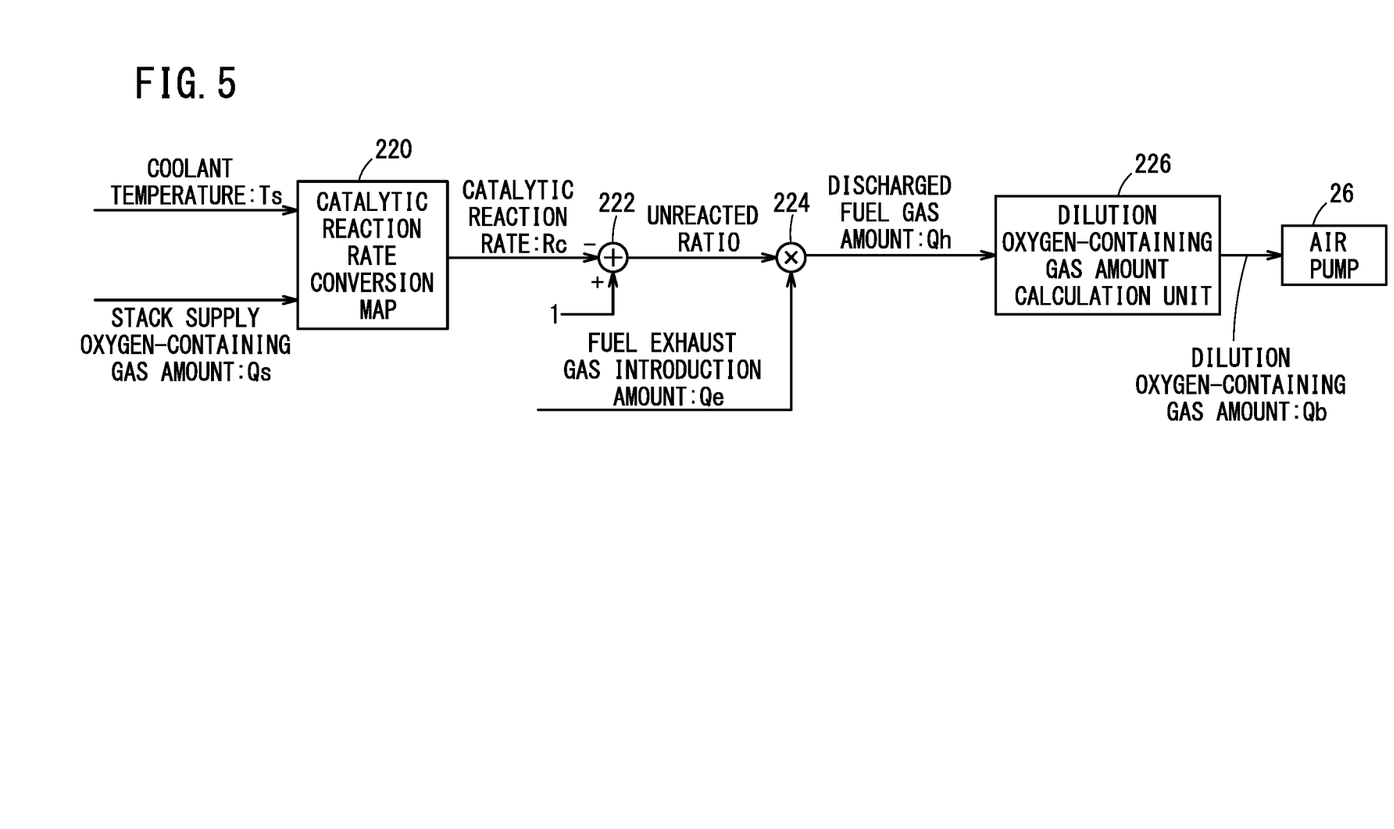
FIG. 5 is a block diagram of a computing means of a control unit for executing a processing according to the flowchart.

FIG. 5 is a block diagram showing the computing means of the control unit 12 for executing the processing according to the flowchart.

The coolant temperature (coolant outlet temperature) Ts or the stack supply oxygen-containing gas amount Qs is converted into the catalytic reaction rate Rc through a catalytic reaction rate conversion map 220 (including the characteristics 201 and 202 of FIGS. 4A and 4B) (corresponding to step S2).

Next, a subtractor 222 subtracts the catalytic reaction rate Rc from the value 1 to calculate the unreacted reaction rate (1−Rc). Further, a multiplier 224 calculates the discharged fuel gas amount Qh as shown in the equation (2) (corresponding to step S3).

Next, a dilution oxygen-containing gas amount calculation unit 226 calculates the dilution oxygen-containing gas amount Qb (increase amount) as described using the equation (3) (corresponding to step S4). The calculated dilution oxygen-containing gas amount Qb is added to the stack supply oxygen-containing gas amount Qs calculated separately, to adjust the discharge oxygen-containing gas amount Qo (Qo=Qb+Qs), so that the air pump 26 is driven based on the adjusted amount (corresponding to step S5).

Inventions that can be Grasped from Embodiments

The invention that can be understood from the above embodiment will be described below. Although, to facilitate understanding, the constituent elements are designated by the reference numerals used in the above-described embodiment, the constituent elements are not limited to those elements to which such reference numerals are applied.

According to the present invention, there is provided a fuel cell system 14 including a fuel cell configured to generate power by using an oxygen-containing gas discharged from an air pump 26 and supplied to a cathode 42 through an inlet of a cathode flow field 47 and a fuel gas supplied to an anode 43 through an inlet of an anode flow field 48, the fuel cell system further including: a communication conduit (communication flow path) 156 configured to introduce a fuel exhaust gas discharged from an outlet of the anode flow field 48 of the fuel cell into the inlet of the cathode flow field 47; and a control unit 12 configured to control the fuel cell system 14, wherein the control unit 12: estimates an amount (discharged fuel gas amount Qh) of fuel gas discharged from an outlet of the cathode flow field 47, of the fuel exhaust gas that is introduced from the communication conduit 156 into the inlet of the cathode flow field 47 and then flows through the cathode 42; calculates an amount of oxygen-containing gas Qb necessary for dilution at a time of discharge into atmosphere, from the estimated amount of fuel gas (discharged fuel gas amount Qh); and sets a discharge amount of the air pump 26, based on the calculated amount of oxygen-containing gas Qb.

According to the present invention, an amount (discharged fuel gas amount Qh) of fuel gas discharged from an outlet of the cathode flow field 47, of the fuel exhaust gas introduced from the inlet of the cathode flow field 47 and flowing through the cathode 42 is estimated; an amount (dilution oxygen-containing gas amount Qb) of oxygen-containing gas necessary for dilution is calculated from the estimated discharged fuel gas amount Qh; and a discharge amount of the air pump 26 is set, based on the calculated dilution oxygen-containing gas amount Qb. Therefore, the amount of the oxygen-containing gas Qb necessary for dilution can be accurately grasped, and the discharge increase of the air pump 26 is set so that the discharge amount of the air pump increases by the amount of the oxygen-containing gas Qb necessary for dilution. As a result, it is possible to optimize the amount of the oxygen-containing gas Qb necessary for dilution and minimize increase in electric power consumed by the air pump 26, thereby suppressing a decrease in electric power efficiency of the fuel cell system 14.

In the fuel cell system, the control unit 12 estimates the amount (discharged fuel gas amount Qh) of fuel gas discharged from the outlet of the cathode flow field 47, based on an amount of fuel exhaust gas introduced into the cathode 42 from the outlet of the anode flow field 48 through the communication conduit 156 and a catalytic reaction rate due to a catalytic reaction occurring in the cathode.

With this configuration, the amount (discharged fuel gas amount Qh) of the fuel gas discharged from the outlet of the cathode flow field 47 is estimated from the amount (fuel exhaust gas introduction amount Qe) of the fuel exhaust gas introduced into the cathode 42 from the outlet of the anode flow field 48 via the communication conduit 156 and the catalytic reaction rate Rc due to the catalytic reaction occurring in the cathode 42.

With this configuration, the discharged fuel gas amount Qh discharged from the outlet of the cathode flow field 47 can be easily obtained as "discharged fuel gas amount Qh discharged from the outlet of the cathode flow field 47=fuel exhaust gas introduction amount Qe introduced into the cathode×(1−catalytic reaction rate Rc)".

In the fuel cell system, the control unit 12 estimates the catalytic reaction rate Rc, based on the temperature of the fuel cell or the amount Qs of the oxygen-containing gas supplied from the air pump 26 to the cathode 42.

In this way, since the catalytic reaction rate Rc is estimated based on the temperature of the fuel cell or the amount of the oxygen-containing gas supplied from the air pump 26 to the cathode 42 (stack supply oxygen-containing gas amount Qs), the catalytic reaction rate Rc can be easily estimated in real time, and an appropriate amount can be set accurately without excessive amount of the oxygen-containing gas necessary for dilution.

According to the present invention, there is a method of controlling a fuel cell system 14 including a fuel cell configured to generate power by using an oxygen-containing gas discharged from an air pump 26 and supplied to a cathode 42 through an inlet of a cathode flow field 47 and a fuel gas supplied to an anode 43 through an inlet of an anode flow field 48, the method including: introducing a fuel exhaust gas discharged from an outlet of the anode flow field 48 of the fuel cell into the inlet of the cathode flow field 47 through a communication conduit (communication flow path) 156; estimating an amount (discharged fuel gas amount Qh) of fuel gas discharged from an outlet of the cathode flow field 47, of the fuel exhaust gas that is introduced from the communication conduit 156 to the inlet of the cathode flow field 47 and then flows through the cathode 42; calculating an amount (oxygen-containing gas amount Qb) of oxygen-containing gas necessary for dilution at a time of discharge into atmosphere, from the estimated amount of fuel gas (discharged fuel gas amount Qh); and setting a discharge amount of the air pump 26, based on the calculated amount of oxygen-containing gas (oxygen-containing gas amount Qb).

With this configuration, of the fuel exhaust gas flowing from the inlet of the cathode flow field 47 to the cathode 42, the amount of fuel gas (discharged fuel gas amount Qh) discharged from the outlet of the cathode flow field 47 is estimated to thereby obtain the amount of oxygen-containing gas (dilution oxygen-containing gas amount Qb) necessary for dilution, from the estimated discharged fuel gas amount Qh, and the discharge amount of the air pump 26 is set on the basis of the obtained amount of oxygen-containing gas (dilution oxygen-containing gas amount Qb). Therefore, the amount of the oxygen-containing gas necessary for dilution (dilution oxygen-containing gas amount Qb) can be accurately grasped, and the discharge increase of the air pump 26 is set so that the discharge amount of the air pump increases by the amount of the oxygen-containing gas Qb necessary for dilution. As a result, it is possible to optimize the amount of the oxygen-containing gas necessary for dilution (dilution oxygen-containing gas amount Qb) and minimize increase in electric power consumed by the air pump 26, thereby suppressing a decrease in electric power efficiency of the fuel cell system 14.

The present invention is not limited to the above-described embodiment, but it goes without saying that various additional or alternative configurations could be adopted therein based on the content disclosed in the present specification.

What is claimed is:

1. A method of controlling a fuel cell system comprising a fuel cell configured to generate power by using an oxygen-containing gas discharged from an air pump and supplied to a cathode through an inlet of a cathode flow field and a fuel gas supplied to an anode through an inlet of an anode flow field, the method comprising:
    introducing a fuel exhaust gas discharged from an outlet of the anode flow field of the fuel cell into the inlet of the cathode flow field through a communication flow path;
    estimating an amount of fuel gas discharged from an outlet of the cathode flow field, of the fuel exhaust gas that is introduced from the communication flow path to the inlet of the cathode flow field and then flows through the cathode;
    calculating an amount of oxygen-containing gas necessary for dilution at a time of discharge into atmosphere, from an estimated amount of fuel gas; and
    setting a discharge amount of the air pump, based on a calculated amount of oxygen-containing gas.

2. The method according to claim 1,
wherein the amount of fuel gas discharged from the outlet of the cathode flow field is estimated based on an amount of fuel exhaust gas introduced into the cathode from the outlet of the anode flow field through the communication flow path and a catalytic reaction rate due to a catalytic reaction occurring in the cathode.

3. The method according to claim 2,
wherein the catalytic reaction rate is estimated based on a temperature of the fuel cell or an amount of oxygen-containing gas supplied from the air pump to the cathode.

4. The method according to claim 1, further comprising:
mixing the fuel gas discharged from the outlet of the cathode flow field with the oxygen-containing gas supplied through a bypass conduit which allows direct communication between the inlet and the outlet of the cathode flow field, for the dilution of the fuel gas discharged from the outlet of the cathode flow field.

* * * * *